Sept. 29, 1936.  C. O. BRANDOW  2,055,997
DRAFT EQUIPMENT
Filed March 28, 1934
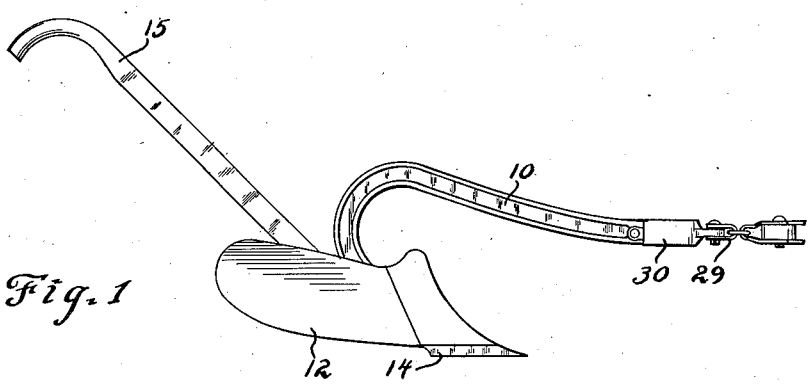
Fig. 1
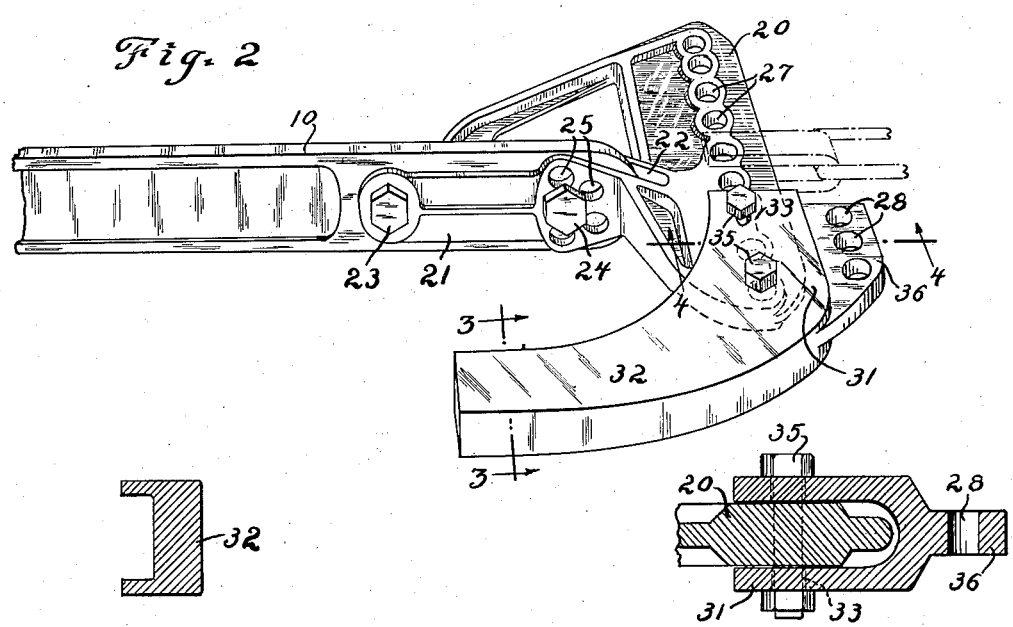
Fig. 2
Fig. 3
Fig. 4
INVENTOR.
Clarence O. Brandow
BY Swan, Frye & Hardesty
ATTORNEYS Patented Sept. 29, 1936

2,055,997

UNITED STATES PATENT OFFICE 2,055,997

DRAFT EQUIPMENT

Clarence O. Brandow, Harbor Beach, Mich.

Application March 28, 1934, Serial No. 717,807

1 Claim. (Cl. 278—96.3)

This invention relates to agricultural and other implements intended to be drawn by external hauling means, being particularly directed to improvement of the front end construction of devices such as plows, cultivators, and the like having rigid forwardly projecting frame or beam portions and which are of somewhat unstable nature so that when hauled around corners the angular application of tractive effort tends to throw the front end upon and drag it along the ground.

It has been found that in using such implements, the draw-head or other draft portions carried by the forward end of the beam or frame are subjected to excessive wear because of such dragging over the ground whenever a corner is turned. In modern plow and cultivator constructions a combined adjusting and draft device is ordinarily carried by the front end of the beam. Such adjustable drawhead is so arranged that the line of pull may be moved up or down as well as to the right or left with respect to the centerline of the beam, to vary the depth and width of the furrow (respectively). It has been found that because of the highly abrasive nature of most soils and stones ordinary pull-head constructions of this nature are rapidly worn out in use in this manner, although the trouble has been regarded as an inescapable one. The replacement of pull-heads worn out in this manner becomes a considerable item of expense, since the head itself must be completely replaced when so damaged and is of relatively expensive construction. Among the important objects of my invention therefore, should be mentioned the provision of means for protecting the head of such an implement against undue wear by such dragging over the ground.

A further object is the provision of protecting means of the sort indicated which comprises a simple and inexpensively replaceable part, of extremely long-lived and rugged construction, and which may easily be replaced independently of the pull-head.

Another important object is the provision of an improved guard for the head of an implement of the mentioned class adapted to facilitate passage of the head thereof through overgrowth and prevent the catching of weeds and other growth in the head.

A still further object is the provision of such a guarding device which is easily shiftable in position from one side of the pull-head to another, as well as from one pull-head to another, to enable its use upon whichever portion of a head is being subjected to dragging, as well as upon any equipment desired.

Other objects and advantages will be apparent from the following description wherein reference is made to the accompanying drawing illustrating preferred embodiments of my invention, and wherein similar reference numerals designate similar parts throughout the several views.

In the drawing:

Figure 1 is a somewhat diagrammatic side elevational view of a plow provided with guarding means constructed in accordance with my invention;

Figure 2 is an enlarged perspective view of the front end of a plow beam provided with an adjustable head of known construction and equipped with one of my improved guard shoes;

Figures 3 and 4 are detailed sections taken substantially on the lines 3—3 and 4—4 respectively of Figure 2 and looking in the direction of the arrows.

Referring now to the drawing, reference character 10 designates the frame or beam of a plow, which in used as an illustrative implement and may be of any conventional or any desired construction, the details of which, since they form no part of my present invention, need not be considered herein. The plow is shown as provided with a mold board 12 and share 14, and with guiding handles 15, while to the front end of the beam is attached an adjustable pull-head, best shown in Figure 2 and comprising a transverse and normally horizontal head portion 20 integrally formed with which are opposed rearwardly extending arms 21—22 adapted to receive between them the head of the plow beam 10, to which the rear ends of the arms are pivotally attached, as by a bolt 23, which permits vertical swinging of the entire head when the bolt 24 is removed, the latter, as shown, being adapted to hold the head against such vertical swinging movement and in any of various possible positions of vertical adjustment determined by the spaced holes 25 in the arms.

Across the front of the head are a plurality of holes as 27 intended for selective attachment of a draft clevis, as 29, to which power may be applied to pull the plow in any desired fashion (not shown). It will be understood that moving the clevis to the right or left by attaching the same to different ones of the laterally spaced holes in the pull-head changes the relative pulling angle and so the width of furrow which the plow tends to cut, while the depth of the furrow may be regulated by changing the effective line of pull vertically, by adjustment of the pull-head on bolts 23—24 in the manner previously described.

Thus far the pull-head construction will be recognized as a typical one which, although frequently varied, nevertheless conforms to the general practice insofar as present day pull-head construction is concerned. These pull-heads are necessarily of none too massive construction in their forward parts. They must, moreover, be more or less malleable if actual breakage is to be avoided. As a result, every time the plow is pulled around a corner when in use, it is tipped upon its side and the front of the beam and plowhead are dragged along the ground for some distance, and until the plow is again on the straightaway, the head being thus abraded by the ground, stones and the like, and quickly worn away and rendered unusable, although the rate of such destruction of course depends upon the nature of the terrain. As is well known, a plowman ordinarily continues to make his circuit of a field being plowed, turning always in the same direction, (ordinarily the right) until the work is finished, one end of the draw-head being thus subjected to severe abuse in the manner described at every turning.

The pull-head is so constructed as to be invertible with respect to the beam, so that the draft holes on either side of the centerline may be made to project from whichever side of the beam is desired. The two ends of the head, although shown of slightly variant construction may be the same, and are of substantially the same thickness, in either event, and the distances between the clevis holes 28 and its front edge are similar.

The wear shoe and skid element 30 is formed with a channeled front portion 31 adapted to fit over the pull-head and to cover the front and one end thereof, and such portion covering the jecting end is extended rearwardly in the form of a smooth curved skid and wear section 32 substantially of the contour indicated in the drawing. The skid section will be seen to be so shaped that when the plow tilts to the side carrying this element, the skid rather than the end of the pull head is thrown into contact with the ground. The contour of the skid is such that it tends to slide easily over even rough terrain, and to force aside and smoothly slide over underbrush and weeds. The wearing surface of the skid is also preferably thick enough to stand up during long service, and its length is sufficient to provide considerable surface for ground engagement, thereby tending to prevent it from unduly sinking or digging into the ground.

In the channeled front portion of the combined skid and guard member are formed a plurality of securing apertures shown as slots 33 permitting variant spacing of the securing bolts 35, to adapt the device to securance to pull-heads having differently spaced draft apertures. Projecting forwardly from the front or securing portion 31 of the guard is a supplementary draft portion 36 having draft apertures 28 therein adapted to be used substitutively for the draft apertures 27 which are covered by the securing portions of the skid.

It will be seen that the skid may be attached to any pull-head having a forward portion of such dimensions that it may be fitted thereover, and that the skid may be removed and secured upon the opposite end of the same or upon another pull-head. It will also be appreciated that in event of final wearing out of either the skid proper or the draft portion 36 thereof, the simple replacement of the inexpensive skid itself is all that is necessary, and returns the draft portion of the plow or other implement to full effectiveness.

It will be understood also that the skid portion, might, with the sacrifice of certain advantages, be formed integrally with the pull-head, and that one skid portion might be carried by each end of the head if desired.

While it will be apparent that the illustrated embodiments of my invention herein disclosed are well calculated to adequately fulfill the objects and advantages primarily stated, it is to be understood that the invention is susceptible to variation, modification and change within the spirit and scope of the subjoined claim.

What I claim is:

A wear skid for the pull heads of plows and the like comprising a channeled element curved in the plane of the channel and having webs adapted to overlie and underlie a plow head, and securable thereto by fastening means passed through said web and plow head, the curved portion of said channeled element being adapted to extend around and rearwardly from one end of the plow head, and a supplementary draft portion projecting forwardly from the channeled element in a plane substantially parallel to said webs.

CLARENCE O. BRANDOW.